(12) United States Patent
Sinha et al.

(10) Patent No.: US 10,216,724 B2
(45) Date of Patent: Feb. 26, 2019

(54) PERFORMING SEMANTIC ANALYSES OF USER-GENERATED TEXTUAL AND VOICE CONTENT

(71) Applicant: Conduent Business Services, LLC, Dallas, TX (US)

(72) Inventors: Manjira Sinha, Bengaluru Karnataka (IN); Tridib Mukherjee, Karnataka (IN); Preethy Varma, Karnataka (IN); Satarupa Guha, West Bengal (IN)

(73) Assignee: Conduent Business Services, LLC, Dallas, TX (US)

( * ) Notice: Subject to any disclaimer, the term of this patent is extended or adjusted under 35 U.S.C. 154(b) by 22 days.

(21) Appl. No.: 15/481,820

(22) Filed: Apr. 7, 2017

(65) Prior Publication Data

US 2018/0293978 A1    Oct. 11, 2018

(51) Int. Cl.
| | |
|---|---|
| *G10L 15/00* | (2013.01) |
| *G06F 17/00* | (2006.01) |
| *G06F 17/27* | (2006.01) |
| *G06N 3/02* | (2006.01) |
| *G10L 15/26* | (2006.01) |

(52) U.S. Cl.
CPC ........ *G06F 17/2785* (2013.01); *G06F 17/273* (2013.01); *G06N 3/02* (2013.01); *G10L 15/26* (2013.01)

(58) Field of Classification Search
CPC ......... G06F 17/30707; G06F 17/30011; G06F 17/2715
See application file for complete search history.

(56) References Cited

U.S. PATENT DOCUMENTS

| | | | | |
|---|---|---|---|---|
| 8,548,951 | B2* | 10/2013 | Solmer | G06F 17/30073 704/9 |
| 9,298,814 | B2* | 3/2016 | Bryars | G06F 17/30707 |
| 9,575,952 | B2* | 2/2017 | Kumar Rangarajan Sridhar | G06F 17/2715 |
| 9,928,231 | B2* | 3/2018 | Kumar Rangarajan Sridhar | G06F 17/2715 |
| 2012/0233127 | A1* | 9/2012 | Solmer | G06F 17/30073 707/661 |
| 2014/0280166 | A1* | 9/2014 | Bryars | G06F 17/30707 707/738 |

(Continued)

OTHER PUBLICATIONS

Hu et al., Spatial Topic Modeling in Online Social Media for Location Recommendation, Proceedings of the 7th ACM Conference on Recommender Systems, RecSys '13, pp. 25-32, 2013.

(Continued)

*Primary Examiner* — Edgar X Guerra-Erazo
(74) *Attorney, Agent, or Firm* — Jones Robb, PLLC

(57) ABSTRACT

Performing semantic analysis on a user-generated text string includes training a neural network model with a plurality of known text strings to obtain a first distributed vector representation of the known text strings and a second distributed vector representation of a plurality of words in the known text strings, computing a relevance matrix of the first and second distributed representations based on a cosine distance between each of the plurality of words and the plurality of known text strings, and performing a latent dirichlet allocation (LDA) operation using the relevance matrix as an input to obtain a distribution of topics associated with the plurality of known text strings.

19 Claims, 8 Drawing Sheets

(56) References Cited

U.S. PATENT DOCUMENTS

| | | | |
|---|---|---|---|
| 2016/0110343 A1* | 4/2016 | Kumar Rangarajan Sridhar | G06F 17/2715 704/9 |
| 2016/0170982 A1* | 6/2016 | Djuric | G06N 3/0454 707/740 |
| 2017/0116178 A1* | 4/2017 | Kumar Rangarajan Sridhar | G06F 17/2715 |
| 2018/0121539 A1* | 5/2018 | Ciulla | G06F 17/30734 |

OTHER PUBLICATIONS

Ritter et al., Open Domain Event Extraction from Twitter, Proceedings of the 18th ACM SIGKDD International Conference on Knowledge Discovery and Data Mining, KDD '12, pp. 1104-1112, 2012.

Mani et al., Robust Temporal Processing of News, Proceedings of the 38th Annual Meeting on Association for Computational Linguistics, ACL '00, pp. 69-76, 2000.

Blei et al., Latent Dirichlet Allocation, Journal of Machine Learning Research 3, pp. 993-1022, 2003.

Ramage et al., Labeled LDA: A Supervised Topic Model for Credit Attribution in Multi-Labeled Corpora, Proceedings of the 2009Conference on Empirical Methods in Natural Language Processing: vol. 1-vol. 1, EMNLP '09, pp. 248-256, 2009.

Ester et al., A Density-Based Algorithm for Discovering Clusters in Large Spatial Databases with Noise, Proceedings of 2nd International Conference on Knowledge Discovery and Data Mining, KDD '96, pp. 226-231, 1996.

Ritter et al., Named Entity Recognition in Tweets: An Experimental Study, Proceedings of the Conference on Empirical Methods in Natural Language Processing, EMNLP '11, pp. 1524-1534, 2011.

Hartigan et al., Algorithm AS 136: A K-Means Clustering Algorithm, Applied Statistics, pp. 100-108, 1979.

Mimmo et al., Optimizing Semantic Coherence in Topic Models, Proceedings of the Conference on Empirical Methods in Natural Language Processing, EMNLP '11, pp. 262-272, 2011.

Rehurke et al., Software Framework for Topic Modelling with Large Corpora, Proceedings of the 1st Workshop on Vector Space Modeling for Natural Language Processing, pp. 192-200, 2015.

Qu et al, Space-Time Aware Behavioral Topic Modeling for Microblog Posts, IEEE Data Eng. Bull., 38:2, pp. 58-67, 2015.

Abdelhaq et al., EventTweet: Online Localized Event Detection from Twitter, Proc. VLDB Endow, 6:12, pp. 1326-1329, 2016.

Pedregosa et al., Scikit-learn: Machin Learning in Python, Journal of Machin Learning Research, vol. 12, pp. 2825-2830, 2011.

Hong et al., Empirical Study of Topic Modeling in Twitter, Proceedings of the First Workshop on Social Media Analytics, SOMA '10, pp. 80-88, 2010.

Sridhar, Unsupervised Topic Modeling for Short Texts Using Distributed Representations of Words, Proceedings of the 1st Workshop on Vector Space Modeling for Natural Language Processing, pp. 192-200, 2015.

Kataria et al., Supervised Topic Models for Microblog Classification, IEEE International Conference on Data Mining, pp. 793-798, 2015.

Lee et al., A Novel Approach for Event Detection by Mining Spatio-Temporal Information on Microblogs, International conference on Advances in Social Networks Analysis and Mining, pp. 254-259, pp. 2011.

Yan et al., A Biterm Topic Model for Short Texts, Proceedings of the 22nd International Conference on World Wide Web, WWW '13, pp. 1445-1456, 2013.

Haversine Formula, https://en.wikipedia.org/wiki/Haversine_formula, 2017.

* cited by examiner

PERFORMING SEMANTIC ANALYSES OF USER-GENERATED TEXTUAL AND VOICE CONTENT

FIELD

The presently disclosed embodiments are generally related to linguistics. More particularly, the present embodiments relate to systems and methods for performing semantic analyses of user-generated textual and voice data and extracting actionable topics therefrom.

TECHNICAL BACKGROUND

There is an ongoing movement in the digital era towards user-generated online content. Whereas, in the recent past, information was generated by a content provider associated with a network provider, and disseminated to users via the network (such as, for instance, the Internet), modern devices and applications thereon enable users to generate and share content in far greater volumes than content providers. For example, real-time social network is enabling users to share their experiences related to a wide variety of topics, such as entertainment (music and film reviews), transit (road conditions, traffic incidents), weather, health, municipal issues (flooding, power loss), etc. In other words, everyday end-users are participating directly in generating useful content that can be used to perform remedial measures, such as repairs, traffic management, deployment of service vehicles, etc.

Various systems and platforms are available for users to generate and publish content. Smart devices with location capabilities and broadband Internet capabilities are used to take pictures, add locations, type text, and upload picture/text messages. Social media platforms/websites (such as Facebook, Twitter, etc.), online blogs, web forums, among others, provide hosting capabilities for user-generated content. The user-generated content may be shared across various communities based on social connection, location, and even worldwide. Users can therefore utilize such platforms to voice their concerns related to various topics, and discuss desired remedies. Moreover, such concerns are of immense value to stakeholders who provide services to the users, such as state and local governments, municipal agencies, police and emergency departments, and other entities. Therefore, a proper and efficient analysis of such user-generated online content is of great importance in order to identify and resolve user's grievances efficiently and in a timely fashion.

However, owing to the enormity and the dynamism of user-generated content sourced from various sources, gaining knowledge about the pressing issues related to specific topics identified above (and others) is not a trivial task. This is particularly true when prior information associated with the content (i.e. context) is almost always absent, and there is usually no method to ascertain or verify the accuracy of the determined topics. Moreover, many issues discussed online are multi-dimensional, in the sense that they are contextualized with respect to multiple topic or sub-topics. Further, identifying issues or problems from the user-generated content is quite different from the problem of event detection in which burstiness is usually the single most important characteristic of the data and the time window for determination is typically short. In contrast, the topics identified in user-generated content are continuously occurring and are more evenly distributed across time. In other words, the presumption about detecting events is that they generally do not occur, whereas the issues present in user-generated content are more likely to be recurring or persistent.

In addition, certain issues associated with a topic and having relevance to a specific community or location may not be relevant to a different community or location. For example, a first location may be prone to traffic congestion based on increased vehicular traffic in the first location, whereas a second condition may be a low-lying region that suffers from water logging issues. A topic that includes an issue or a problem that can be Moreover, these relationships vary over time, which increases the difficulty in performing analysis of this information. Difficulties in ascertaining relevant topics and issues arising therefrom and associated with specific locations and communities in real-time can result in additional difficulties in solving these issues. For example, the rate of deployment of service vehicles is hampered by an inability of a municipal agency to identify the specific service provider that deploys the service vehicles. Although agencies and providers are increasingly connected via networks, determining the appropriate network (or subnetwork) associated with a specific service provider remains challenging, at least due to the difficulty in determining a topic based on the user-generated content, and identifying issues therefrom.

SUMMARY

In an exemplary embodiment, a method for performing semantic analysis on a user-generated text string includes training a neural network model with a plurality of known text strings to obtain a first distributed vector representation of the known text strings and a second distributed vector representation of a plurality of words in the known text strings, computing a relevance matrix of the first and second distributed representations based on a cosine distance between each of the plurality of words and the plurality of known text strings, performing a latent dirichlet allocation (LDA) operation using the relevance matrix as an input to obtain a distribution of topics associated with the plurality of known text strings, and refining the distribution of topics based on adding the user-generated text string to the plurality of known text strings to obtain a refined distribution of topics including the user-generated text string.

In another exemplary embodiment, a method for performing semantic analysis on a user-generated text string includes identifying a plurality of most-recurring topics from user-generated content obtained from a one or more data sources, wherein the user-generated content comprises a plurality of text strings, labeling the plurality of most-recurring topics as seed topics, extracting a plurality of contextually similar words associated with each of the seed topics, wherein the extracting comprises querying a neural network model, computing a relevance matrix based on a cosine distance between each of the plurality of contextually similar words and the plurality of text strings from the user-generated content, and performing a latent dirichlet allocation (LDA) operation using the relevance matrix as an input to obtain a distribution of issues related to the seed topics.

In another exemplary embodiment, a system for extracting actionable topics from user-generated content includes a first processing module communicably coupled to one or more content-generation systems and a second processing module communicably coupled to the first processing module. While the first processing module is configured to obtain user-generated content from said one or more content-generation systems, the second processing module is configured to extract a location associated with the user-generated content, a time associated with the user-generated content, and an actionable topic associated with the user-generated content, wherein at least one of the location, the time, and the actionable topic are extracted by performing semantic analysis on a text string within the user-generated content, identify a remedial action based on the actionable topic, and transmit a recommendation to a service provider network associated with the actionable topic, wherein the recommendation comprises the identified remedial action, the location, and the time.

Additional objects and advantages of the present disclosure will be set forth in part in the description which follows, and in part will be obvious from the description, or may be learned by practice of the present disclosure. The objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure, as claimed.

The accompanying drawings, which are incorporated in and constitute a part of this specification, illustrate embodiments of the present disclosure and together with the description, serve to explain the principles of the present disclosure.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. The various exemplary embodiments are not intended to limit the disclosure. To the contrary, the disclosure is intended to cover alternatives, modifications, and equivalents.

References to "one embodiment," "at least one embodiment," "an embodiment," "one example," "an example," "for example," and so forth are used to indicate that embodiment(s) or example(s) may include a particular feature, structure, characteristic, property, element, and/or limitation. But, not every embodiment or example necessarily includes that particular feature, structure, characteristic, property, element, and/or limitation. Furthermore, repeated use of the phrase "in an embodiment" does not necessarily refer to the same embodiment.

Figure 1:
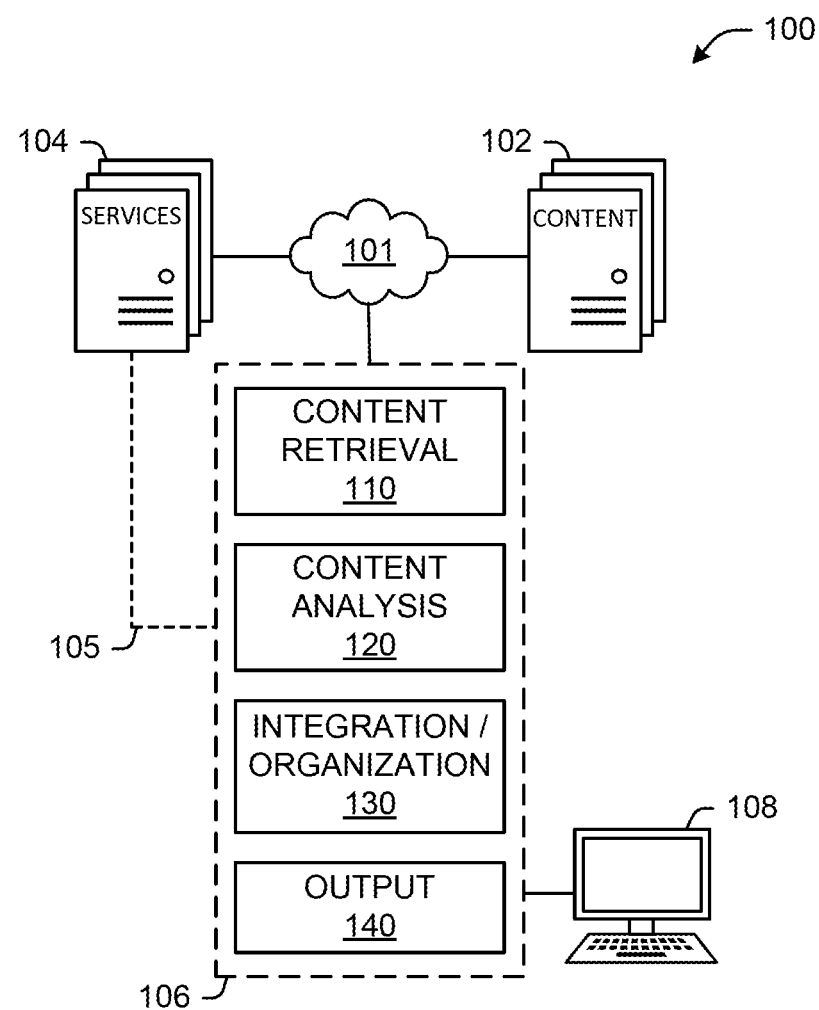
FIG. 1 shows an exemplary system for performing semantic analysis of user-generated content.

FIG. 1 shows an exemplary system 100 for performing semantic analysis of user-generated content. System 100 comprises a network 101, one or more content servers 102, one or more service provider servers 104, and a processing node 106 communicatively coupled to network 101 and a user terminal 108. The various components of system 100 may be interconnected with each other over network 101. For example, processing node 106 can communicate with content server 102 and/or the one or more service provider servers 104 over network 101. Further, processing node 106 may be in direct communication with the one or more service provider networks 104 via a communication link 105. A person having ordinary skill in the art would understand that the embodiments disclosed herein may also be implemented using different configurations comprising multiple processing nodes, distributed terminals, and combinations of networks, without departing from the scope of the disclosure. Further, a person having ordinary skill in the art would understand that processing node 106, as well as each of content servers 102 and service provider servers 104 include a processor and a memory, with the memory storing computer-readable logic, or logical modules, that are executed by the processor to perform the various operations described herein.

For example, processing node 106 is configured to store and execute a content retrieval module 110, a content analysis module 120, an integration and organization module 130, and an output module 140. These modules comprise logical instructions that enable processing node 106 to perform semantic analyses of user-generated content, as further described herein. For example, content retrieval module 110 may be executed to obtain user-generated content from the one or more content servers 102. The one or more content servers 102 may comprise any combination of online social networks, social media platforms, websites such as Facebook, Twitter, etc., online blogs, web forums, etc. The user-generated content sourced from content servers 102 can include one or more text strings. For example, the one or more text strings include a post on the online social network, a reply on the online social network, or a comment on a blog or forum. Content retrieval module 110 may further obtain user-generated content from the one or more service provider servers 104. For example, service provider servers 104 can include a voicemail server, wherein the user-generated content comprises a voicemail message. In this case, content retrieval module 110 is further configured to transcribe the voicemail message into a text string. As further described herein, an initial set or corpus of text strings sourced from user-generated content may be utilized to train neural network models, such as word and document vector models, as further performed by content analysis module 120. For optimized training, content retrieval module 110 is further configured to clean the text strings as further described herein and with reference to FIGS. 2-3. For purposes of this disclosure, an initial set of cleaned text strings provided to content analysis module 120 is hereinafter referred to as an 'input document'.

Content analysis module 120 is configured to perform semantic analyses on the input document to extract information from the input document to determine a location associated with the user-generated content, a time associated with the user-generated content, and an actionable topic associated with the user-generated content. As further described herein and with reference to FIGS. 4-7, performing semantic analysis on the document includes training a neural network model with a plurality of known text strings to obtain a first distributed vector representation of the known text strings and a second distributed vector representation of a plurality of words in the known text strings, computing a relevance matrix of the first and second distributed representations based on a cosine distance between each of the plurality of words and the plurality of known text strings, and performing a latent dirichlet allocation (LDA) operation using the relevance matrix as an input to obtain a distribution of topics associated with the plurality of known text strings, as well as a location and time associated with each text string. In other words, an LDA module is configured with a distribution of words in a document (i.e. the plurality of text strings), where each probability value corresponding to each word in the vocabulary is given by a distance measure between the word and the document on the text string, and utilizing a term-document frequency matrix (i.e. relevance matrix) for the LDA, wherein the term-document frequency matrix is associated with a topic. In an embodiment, time or location metadata may be extracted from the user-generated content by content retrieval module 110, and correlated with corresponding time or location extracted using semantic analysis of the alphanumeric string as performed by content analysis module 120. Further, output module 140 clusters the topics by grouping the data around the key themes associated with each topic.

Figure 8:
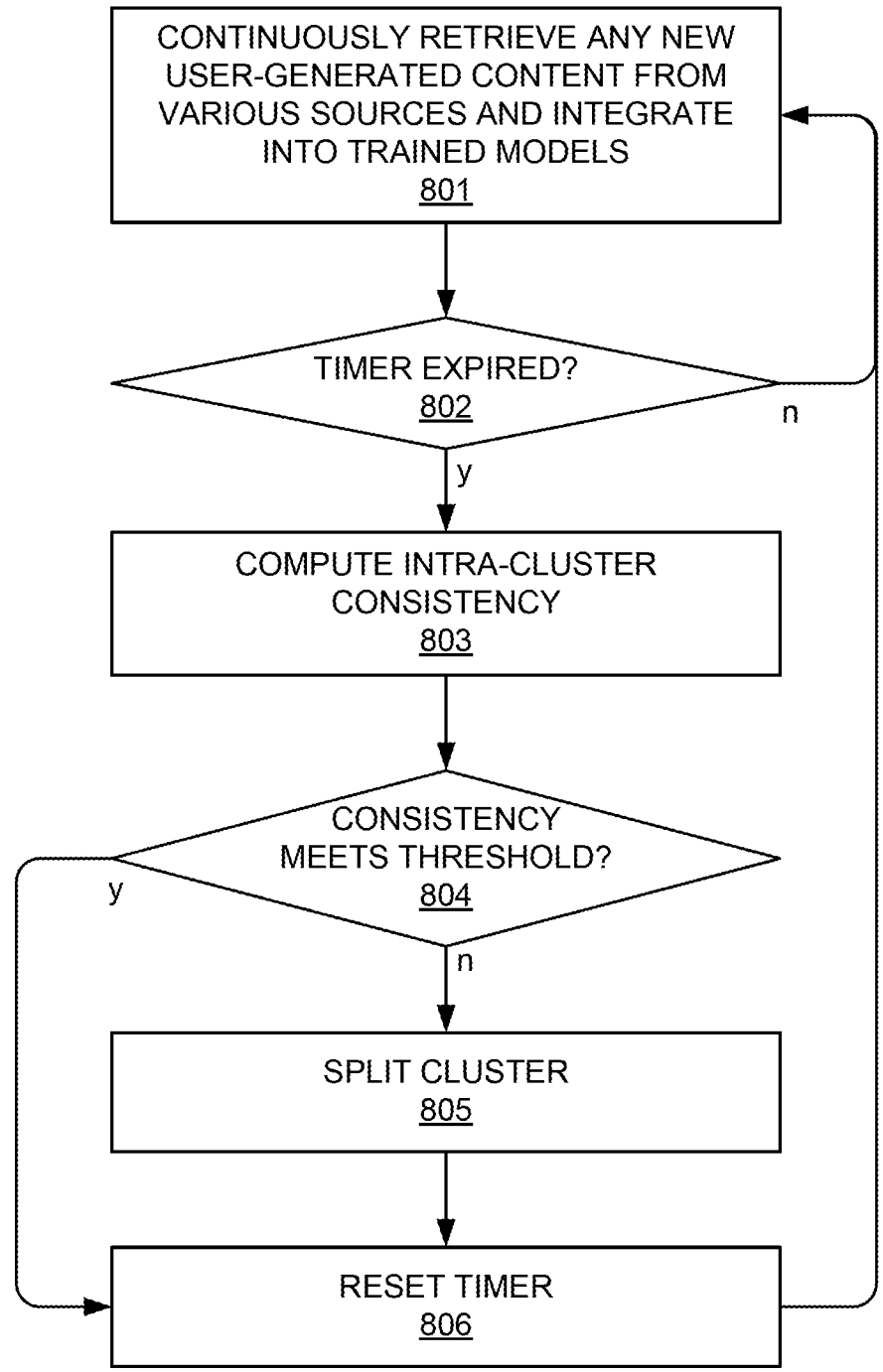
FIG. 8 shows an exemplary method for integrating new user-generated content and organizing topics.

Integration and organization module 130 is executed to monitor new user-generated content (i.e. text strings published subsequent to the input document used to train the neural network modules), incorporate the new content into the modules, and refine the topics as further described herein and with reference to FIG. 8. These operations are performed to enable system 100 to further classify new unseen content into any of the topics in the distribution, or to add new topics. For example, after output module 140 generates a topic cluster associated with the location and time, based on semantic analysis of the input document, new unseen user-generated content from content servers 102 and/or service provider servers 104 is provided as input and further used to compute an intra-cluster consistency at periodic intervals or timestamps. If the intra-cluster consistency is less than a certain threshold, the cluster in question may be split to retain the consistency.

In an exemplary embodiment, a service provider is correlated with the retrieved topics to determine whether or not an identified topic is associated with an actionable issue. A trigger of a remedial action associated with the problem is transmitted to one or more of service provider servers 104, enabling the service provider to perform a remedial action. In some embodiments, a remedial action based on the actionable topic may be transmitted as a recommendation that includes the identified remedial action, the location, and the time. For example, in response to determining that traffic congestion occurs at a particular location at a particular time, a traffic signal system accessible via a traffic management subnetwork hosted on one service provider server 104 may be instructed to modify the frequency of one or more traffic signals. Other applications of the described techniques will be evident to those having ordinary skill in the art in light of this disclosure.

Figure 2:
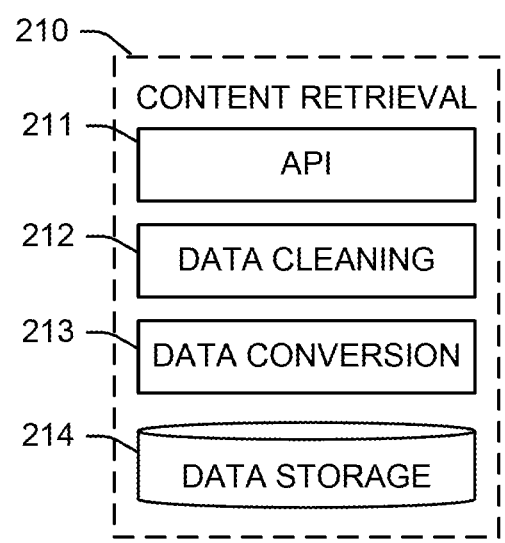
FIG. 2 shows an exemplary content retrieval module.

FIG. 2 shows an exemplary content retrieval module 210, comprising an application programming interface (API) module 211, a data cleaning module 212, a data conversion module 213, and a data storage 214. A person having ordinary skill in the art would understand that content retrieval module 210, as well as each of (API) module 211, a data cleaning module 212, a data conversion module 213, and a data storage 214 may comprise a combination of computer-readable logic instructions stored on a memory, and executable by a processor to perform the various operations described herein.

For example, user-generated content that is hosted at various web and social media sites is obtained at regular intervals using appropriate APIs. For example, in-order to crawl data from Facebook®, Twitter®, and various web portals, API module 211 can include a Graph® API, representational state transfer (REST) or RESTful API, and other web services for providing interoperability between computer systems on the Internet such as HTML/XML parsers are used respectively. Such REST-compliant online services allow requesting systems such as content retrieval module 210 to access and manipulate textual representations of Web resources using a uniform and predefined set of stateless operations. The Rest APIs (written in JavaScript) may be used to store the user-generated content in data storage 214, which may comprise a MySql® database. Other forms of web services exist, which expose their own arbitrary sets of operations such as WSDL and SOAP.

Further, the plurality of text strings, including the text strings comprising the input document, are cleaned or prepared by a data cleaning module 212. The cleaning includes one or more of removing symbols, identifying and removing spurious textual patterns, correcting spelling, filtering generic and domain-specific stop words, and filtering based on length. For example, data cleaning module 212 include instructions for removing the noise from the data such as the hashtags (#), at the rate symbols (@), 'http' links, and other extraneous textual content. For some of the sources, some spurious text is often attached with the original post, and data cleaning module 212 also removes such text by identifying the textual pattern and eliminating any text matching the pattern. Further, spell-correction and stop word removal is performed on the data.

Finally, data conversion module 213 converts any format of data into a form suitable for subsequent analysis. For example, in an embodiment, voice data may be retrieved from voicemails hosted by a service provider server. The voicemails may comprise customer complaints or requests for service. Data conversation module 213 converts the voicemails to text using any known transcribing methods, and the text may be cleaned by data cleaning module 212. Eventually, the cleaned data is provided to an analysis module. For example, a threshold amount of text strings considered to be sufficient to train a neural network may be assembled into an input document prior to training the neural network. Subsequently, additional content may be incorporated periodically.

Figure 3:
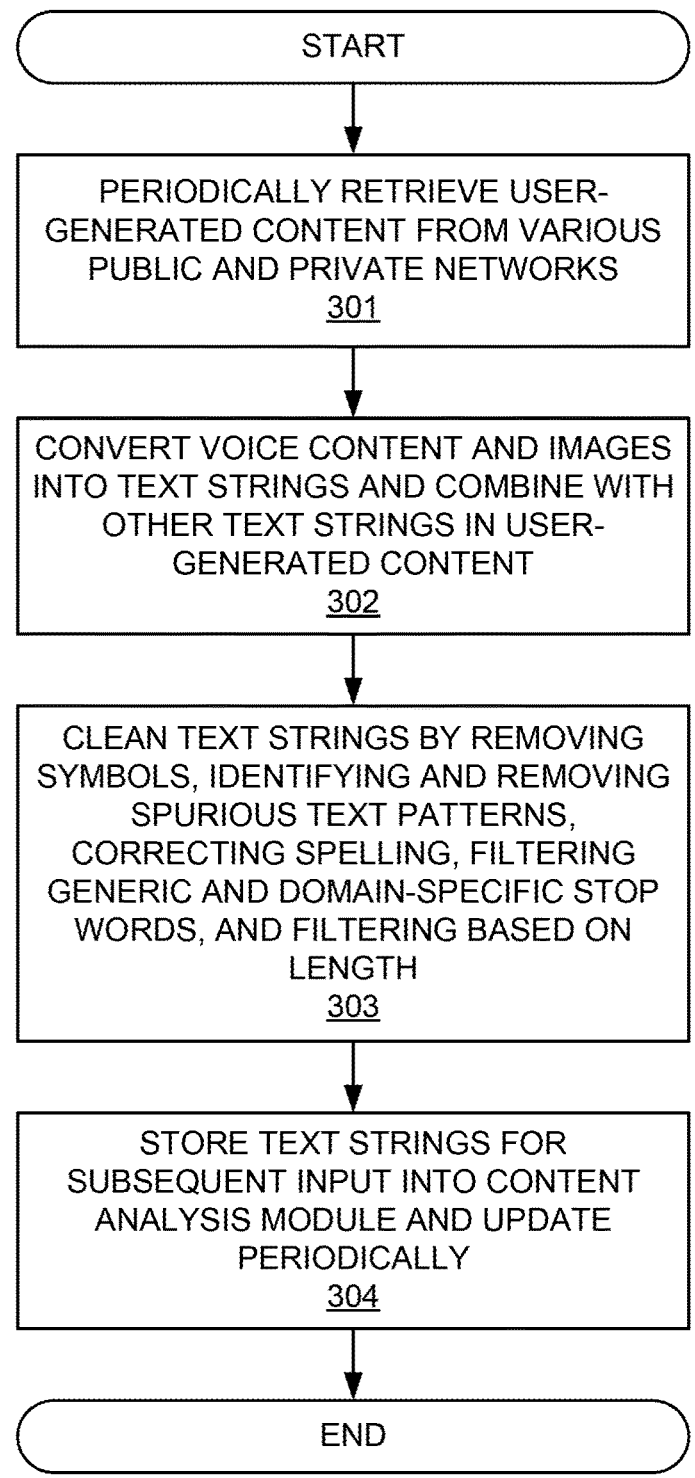
FIG. 3 shows an exemplary method for retrieving and preparing user-generated content for semantic analysis performed thereon.

FIG. 3 shows an exemplary method for retrieving and preparing user-generated content for semantic analysis performed thereon. The method of FIG. 3 is illustrated with respect to a content retrieval module 110 of FIG. 1 or 210 of FIG. 2. In other embodiments, the method can be implemented with any suitable processing node/module. Although FIG. 3 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 301, user-generated content that is hosted at various public and private networks (such as web and social media sites and service provider servers) is periodically retrieved at regular intervals. The content may be retrieved using appropriate APIs, such as above-described services for providing interoperability between computer systems on the Internet. Further, content such as voicemails and email messages may be retrieved from service provider networks via direct private connections or via the Internet. Images such as screenshots and other metadata associated with text strings, voice messages, and other messages may also be retrieved. At 302, voice content and other formats of data are converted into text strings.

At 303, the plurality of text strings, including the text strings comprising the input document, are cleaned or prepared. The cleaning includes one or more of removing symbols, identifying and removing spurious textual patterns, correcting spelling, filtering generic and domain-specific stop words, and filtering based on length. Cleaning includes, for example, removing the noise from the data such as the hashtags (#), at the rate symbols (@), 'http' links, and other extraneous textual content. For some of the sources, some spurious text is often attached with the original post, such text may be removed by identifying the textual pattern and eliminating any text matching the pattern. Further, spell-correction and stop word removal is performed on the data.

Eventually, at 304, the cleaned data is stored and updated in order to periodically train the neural network models. For example, a threshold amount of text strings considered to be sufficient to train a neural network may be stored and assembled into an input document prior to training the neural network. Subsequently, additional content may be incorporated periodically.

Figure 4:
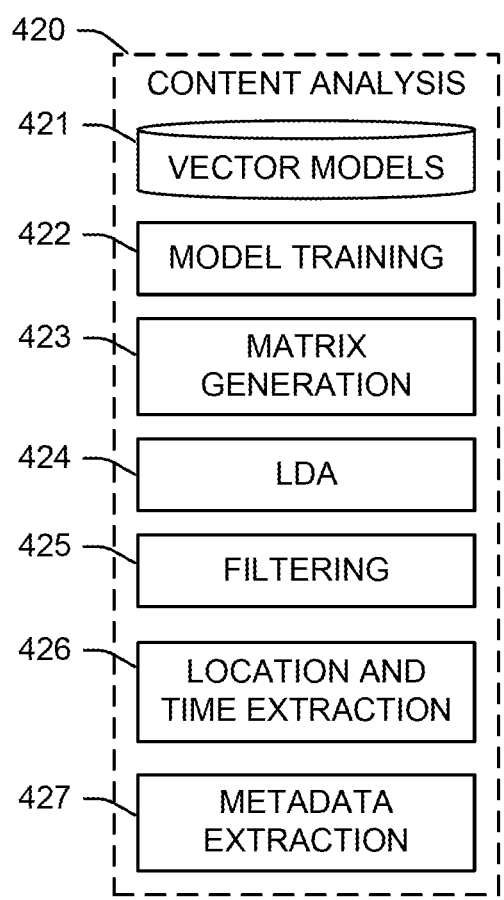
FIG. 4 shows an exemplary content analysis module for performing semantic analysis of user-generated content.

FIG. 4 shows an exemplary content analysis module 420 for performing semantic analysis of user-generated content. A person having ordinary skill in the art would understand that content analysis module 210, as well as each of vector models 421, model training module 422, matrix generation module 423, LDA module 424, filtering module 425, location and time extraction module 426, and metadata extraction module 427 may comprise a combination of computer-readable logic instructions stored on a memory, and executable by a processor to perform the various operations described herein.

Content analysis module 420 comprises a plurality of modules configured to identify the semantics of the topic or issue from the input document. Content analysis module 420 comprises stored vector models 421 including at least word vector models and document vector models and a model training module 422 that is executed to provide an input document into vector models 421. For example, the first input document comprises numerous text strings of different lengths spread across a wide variety of topics. The words and text strings within the input document (as well as subsequently-added text strings from new user-generated content) may be represented using the models Word2vec and Doc2vec, which are tools for associating arbitrary documents with labels. Word2vec is a group of related models that are used to produce word embeddings. These models are shallow, two-layer neural networks that are trained to reconstruct linguistic contexts of words. Word2vec takes as its input a large corpus of text (such as the input document) and produces a vector space, typically of several hundred dimensions, with each unique word in the corpus being assigned a corresponding vector in the space. Word vectors are positioned in the vector space such that words that share common contexts in the corpus are located in close proximity to one another in the space. Doc2vec is an extension of word2vec that learns to correlate labels and words, rather than words with other words. The disclosed operations include projecting both the text strings and the words in the same dimension, resulting in a first distributed representation of words and a second distributed representation of text strings, and then computing the cosine distance between them to generate a relevance matrix.

Matrix generation module 423 is executed to compute a relevance matrix of the first and second distributed representations based on the cosine distance between each of the plurality of words and the plurality of known text strings. The resultant relevance matrix is provided as an input into LDA module 424. Generally, LDA is a topic modelling technique comprising a generative model to identify the latent topic distribution in texts in an unsupervised manner. LDA treats each document as a mixture of various topics drawn from a Dirichlet prior distribution. LDA takes as input a term-document frequency matrix and relies on word co-occurrences to group together similar documents. This term-document frequency matrix is however very sparse. Moreover, LDA performs well on long context rich documents, as opposed to short and terse posts from different sources such as the described user-generated content. Consequently, specific modifications to the source information provided as input into LDA module 424 can alleviate the problem of sparsity and improve the performance of standard LDA operations. For example, rather than using a sparse term document matrix that contains raw frequency counts of words in a document, the input document is processed by matrix generation module 423 to provide a distribution of words in a document where each probability value corresponding to each word in the vocabulary is given by a distance measure between the word and the document. The result can be equated to a measure of how relevant the word is in the context of the document. This information is significantly more valuable than frequency counts, and enhances the performance of LDA module 424. Specifically, matrix generation module 423 performs operations including projecting the plurality of text strings and the words in the same dimension, and computing the cosine distance between the plurality of text strings and the words. Each row of the relevance matrix indicates the cosine distance (in place of the raw frequency counts).

Thus, LDA module 424 is utilized in conjunction with the training module 422 and matrix generation module 423 for creating dense contextual distributed vector representations of words and documents, enabling LDA module 424 to perform topic modelling for short and sparse texts using distributed representation of words. In other words, leveraging the power of LDA along with the multi-faceted benefits of distributed vector representations enables an efficient topic representation oriented around the key problem areas that will also be able to capture the word-context information sufficiently from the short text content. These operations are enabled by a keyword and distributed representation based approach to identify the topics and problems from the user-generated online content. Further, the topics may be clustered around specific locations or times extracted from the user-generated content.

Filtering module 425 is executed to further narrow the topics output from LDA module 424. In an exemplary embodiment, the plurality of words in the document can be filtered prior to generating the relevance matrix. The filtering includes identifying words associated with one or both of a very high or a very low cosine distance, and performing the LDA operation using the relevance matrix with the filtered words. In another embodiment, the distribution of topics can also be filtered by using key words based on seed topics. In this embodiment, a keyword-based approach is based on the theory that not all words in the vocabulary contribute substantially for every document in the corpus. Only a handful of words contribute the most, so LDA module 424 is directed towards processing the least amount of data that has high information content. The direction of the LDA can be focused on vocabularies within various applications, such as traffic management, civil engineering, etc. Hereinafter referred to as domain knowledge, these specific vocabularies can be leveraged as a form of weak supervision. For example, given user-generated content from various data sources of interest, a plurality of major recurring issues raised by the users can be identified and categorized based on the retrieved topics. A number of categories (for instance, 10) may be predefined as "seeds", and top x words of those categories may be extracted. For example, given the following seed categories: "water", "traffic", "sewage and drains", "road and footpath", "public transport", "pollution", "illegal parking", "garbage", "electricity and power", "crime". Each of these categories is queried using two Word2Vec models and the top 40 most similar words extracted. A pretrained global Word2vec model may be used along with a more specific model trained using the specific topic at hand. While the former is trained on a huge corpus and hence is generic, the latter inspite of being trained on lesser amount of data is much more focused on the topic of interest.

Location and time extraction module 426 is executed to enable association of extracted topics with a location and time. For effective clustering of topics, accurate location identification is preferred. Although metadata extraction module 427 is configured to extract a geotag or other location and time from the user-generated content, such content may not always be geotagged, and geotagging may be inaccurate. Further, most user-generated content that is relevant to the scope of this disclosure (i.e. content related to actionable issues) likely includes a location within the text strings. Thus, location and time extraction module 426 is invoked to extract spatial information from the text strings. A rule based system is used to identify words or phrases that indicate locations from texts. The set of rules are generic, i.e. they are not dependent on a dictionary, and can therefore be applied to any document or content from any location. Locations are generally represented by the name of a place followed by a location indicator keyword. Location indicator keywords may be identified via the LDA topic distributions, and performing multiple iterations thereof. The set of location indicator keywords may further be classified into Location Indicator Nouns, Location Indicator Prepositions and Location Indicator Phrases. Location Indicator Nouns are those nouns, which have a proper noun prefix associated with it. For example, street or town are location indicator nouns. If they are preceded by a proper noun, then it indicates a location or a landmark. Location Indicator Phrases (such as, for instance, "residing at", "living near") may indicate that they are followed by a proper noun term, which indicates a place name. The presence of Location Indicator Prepositions (such as, for instance, "to" and "from") are leveraged to identify location names.

Further, a location name mentioned in a text string may refer to a certain landmark rather than an actual geographic location. Therefore, location information may further be standardized by being fed into a location-based services API such as Google Places® API, and a first-level sub-locality information used as a marker for the area containing the location. Each new sub-locality identified can be added to a list along with its geographic coordinates. If no sub-locality information is returned by the API, then a latitude-longitude coordinate information corresponding to the specific place name is obtained, and compared with the sub-locality information in the existing list. If any list entry is located within a specified radius of the location (for example, ~5 km), the current location is associated with that sub-locality and, if no such entry is found, the location name is stored as a new sub-locality and flagged for future checking. As the database of locations grows with time, if a new sub-locality appears within the distance threshold of a flagged location, then the location is merged with the new locality area and the flag is removed. In this way, location information is dynamically updated.

Thus, each text string of the user-generated content is associated with a geographical coordinate (i.e. latitude, longitude). The resulting topics may be rendered in an interpretable way by grouping together locations that belong to the same neighborhood using a density-based clustering algorithm, such as the density-based spatial clustering of applications with noise (DBSCAN) clustering algorithm for spatial data. Prior to clustering, the coordinate information may be subject to a Haversine transformation to account for the approximately spherical shape of the earth. The Haversine formula is used to compute the great-circle distance between two points, i.e. the shortest distance over the earth's surface. Further, the clustering algorithm takes two parameters as input: a minimum number of samples in a neighborhood for a point to be considered as a core point, and the maximum distance between two samples for them to be considered as in the same neighborhood. The resultant clusters may be output on a map.

Similarly, location and time extraction module 426 is further executed to enable association of extracted topics with a time. Such association is necessary, since unlike location and topic detection, a time stamp is unreliable as it is unlikely that user-generated content is reported in real-time. In other words, most users publish content after a significant time-lapse. For example, text strings may state: "There has been an accident near location X at 9 pm last night", "We have been suffering from this drainage issue for the last six months", or "Last month around Christmas time, the construction started, and that has led to such traffic jams near location Y." It is evident that extracting the temporal information for these posts just based on the timestamp will be incorrect. Hence, similar to location information extraction, temporal information is also inferred from the textual content using a rule-based system for identifying and resolving temporal expressions.

Temporal extraction begins by identifying text strings that are likely to contain reference to any temporal expression. This is based on a curated list of keywords that include temporal connotations, and correlating for the presence of one or more of these keywords in the text strings. The list may comprise, for instance, names of months, the days of the weeks, their abbreviations, and common references like today, tomorrow, yesterday, etc. Subsequently, for each of the identified text strings, indices are identified of the words in the report that match any of the keywords from the curated list. If there is more than one such index in a report, it may be determined that there is a temporal ambiguity in said text string, and the text string is discarded for the purpose of temporal extraction. On the other hand, for text strings that include only one index, a window of up to 5 words to the left and to the right of the index are extracted, and that window of 11 words is considered as the context. In other embodiments, any size of window may be defined.

Then, from the derived context, it is determined whether the temporal reference is in the past, the present or the future. This determination is enabled by a list of modifiers created for each of the past, present and future. For example, the past modifiers include words such as, ago, since, yesterday, last, etc. Text strings that include words directly matching these modifiers are identified. For text strings that do not contain any of these modifiers, the tense is identified via the verbs in the text strings.

Subsequently, upon determining a tense, the text strings are categorized by tense, and present-tense strings are set aside as they can be determined based on a time-stamp extracted by metadata extraction module 427, while the past and future tense categories are processed accordingly. For example, terms associated with the past tense such as "yesterday" are equated with the current date, and numbers (expressed both as a numeral or words) are correlated with nearby temporal terms such as days, months, weeks, etc. For example, if the context comprises a reference to "7 weeks", then 7×7=49 is subtracted from the current day. Similarly, if there is reference to "6 months", 7×30 is subtracted from the current date and the resultant month index is calculated by subtracting 6 from the current month index, and checked if the month overflows to the previous year. If a month name is referenced without a number, then the index is compared with the current month, and if it is, then the month is associated with the current month, and if not, then a year is subtracted from the current year and the month remains the same. Finally, special occasions are parsed to determine the known fixed dates of said occasions. Location and time module 426 perform equivalent operations for text strings comprising future tense terms. Moreover, as described herein, metadata extraction module 427 extracts a time or location metadata from the user-generated content and correlates the metadata with corresponding time or location extracted using the above methods.

Figure 5:
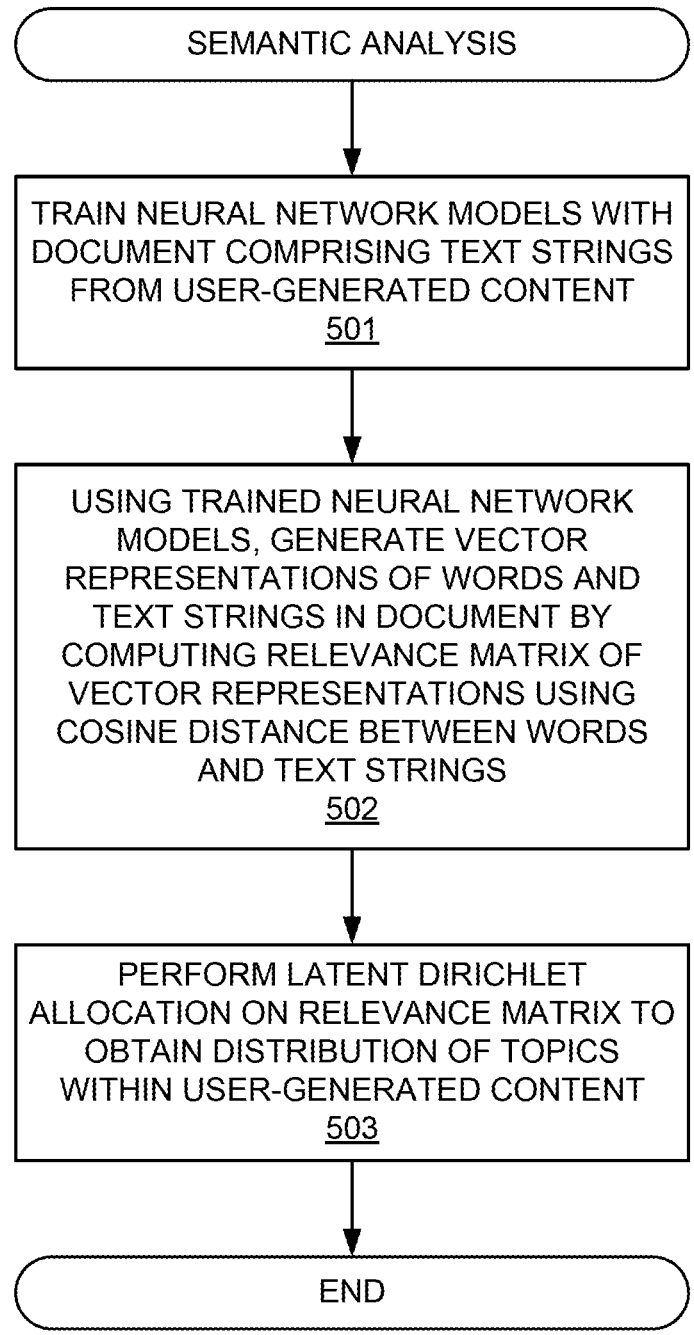
FIG. 5 shows an exemplary method for performing semantic analysis of user-generated content.

FIG. 5 shows an exemplary method for performing semantic analysis of user-generated content. The method of FIG. 5 is illustrated with respect to a content analysis module 120 of FIG. 1 or 420 of FIG. 4. In other embodiments, the method can be implemented with any suitable processing node/module. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 501, one or more neural network models are trained with a document comprising text strings from user-generated content. The user-generated content is sourced from one or more online sources, such as social networks, blogs, etc., as well as from public or private networks associated with service providers. The neural network models include at least word vector models and document vector models. The document is provided as an input into the vector models, and the words and text strings within the input document (as well as subsequently-added text strings from new user-generated content) may be represented using word embeddings, such as Word2vec and Doc2vec. Word vectors are positioned in the vector space such that words that share common contexts in the corpus are located in close proximity to one another in the space. Doc2vec is an extension of word2vec that learns to correlate labels and words, rather than words with other words.

At 502, a vector representation of the words and text strings are generated based on a cosine distance between words and the text strings. This includes projecting both the text strings and the words in the same dimension, resulting in a first distributed representation of words and a second distributed representation of text strings, and then computing the cosine distance between them to generate a relevance matrix. The resultant relevance matrix is provided as an input into LDA module 424. Unlike a sparse term document matrix that contains raw frequency counts of words in a document, the relevance matrix computed herein depicts a probability value corresponding to each word in the vocabulary by a distance measure between the word and the document. The result can be equated to a measure of how relevant the word is in the context of the document. This information is significantly more valuable than frequency counts, and enhances the performance of the LDA operation. At 503, the LDA is performed to generate a distribution of topics in the input document. Generally, LDA takes as input a term-document frequency matrix and relies on word co-occurrences to group together similar documents. However, the modification to the source information performed in steps 501 and 502 to generate the relevance matrix provided as input into the LDA operation can alleviate the problem of sparsity and improve the performance of standard LDA operations. Further, the topics may be clustered around specific locations or times extracted from the user-generated content as further described herein.

Figure 6:
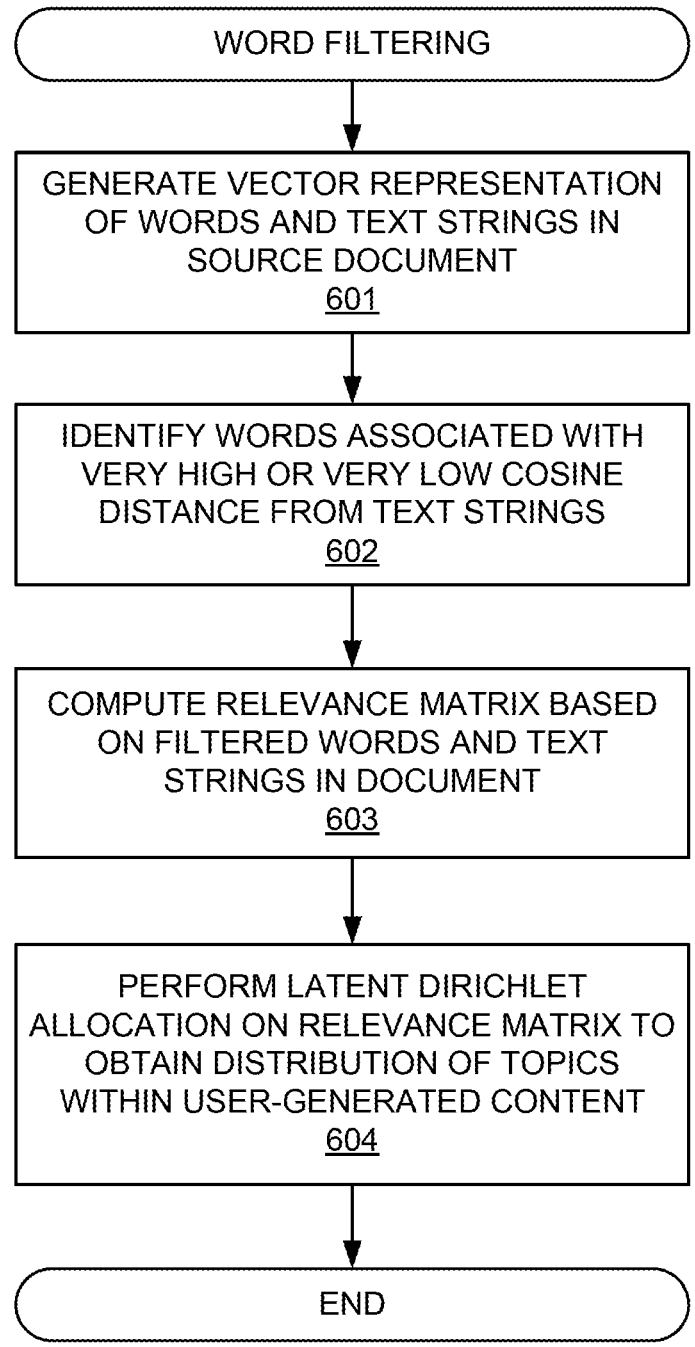
FIG. 6 shows an exemplary method for performing semantic analysis of user-generated content using word filtering.

As described herein, the plurality of words can be filtered prior to generating the relevance matrix. The filtering includes identifying words associated with one or both of a very high or a very low cosine distance, and performing the LDA operation using the relevance matrix with the filtered words. FIG. 6 shows an exemplary method for performing semantic analysis of user-generated content using word filtering. The method of FIG. 6 is illustrated with respect to a content analysis module 120 of FIG. 1 or 420 of FIG. 4. In other embodiments, the method can be implemented with any suitable processing node/module. Although FIG. 6 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 601, the vector representations of words and text strings are generated. For example, the words and text strings may be represented using Word2voc and Doc2vec as described above. Vectors of both the text strings and the words may be projected in the same dimension, and the cosine distance computed between them. Further at 602, words associated with a very high or very low cosine distances from the text strings are identified. In other words, only those words in the vocabulary for a particular document that have either a very high or a very low cosine score are considered. This is based on the theory that only very similar or very dissimilar words contribute to the majority of information needed to characterize a document. The very high and very low cosine score determinations may be based on predefined thresholds. In an exemplary embodiment, all words with cosine scores greater than 0.7 or less than 0.3 are considered.

Thus, at 603, a relevance matrix is computed based on the filtered words and the text strings. Each row of the relevance matrix therefore contains the cosine distance in place of the raw frequency counts. At 604, the LDA operation is performed on the relevance matrix. In other words, the input to the LDA is the word-document matrix, where each document is represented as a vector/list of variable length. The number of elements in the vector comprise the filtered words (that are more relevant the document) and the value of each element is the cosine similarity between the document vector and the filtered word vector. Thus, unlike embodiments where only words that are present in the document get a non-zero value (frequency count) in the input for the LDA, this embodiment assigns a high non-zero value to contextually similar words (i.e. the filtered words).

Further, in an exemplary embodiment, to the LDA input is modified by a keyword-based approach, based on the theory that not all words contribute substantially for every text string in the document. Only a handful of words contribute the most, so the LDA is directed towards processing the least amount of data that has high information content. In this embodiment, vocabularies within various applications (such as, for instance, traffic management, civil engineering, etc.) may be utilized to narrow or filter the topics from the original document. Hereinafter referred to as domain knowledge, these specific vocabularies can be leveraged as a form of weak supervision.

Figure 7:
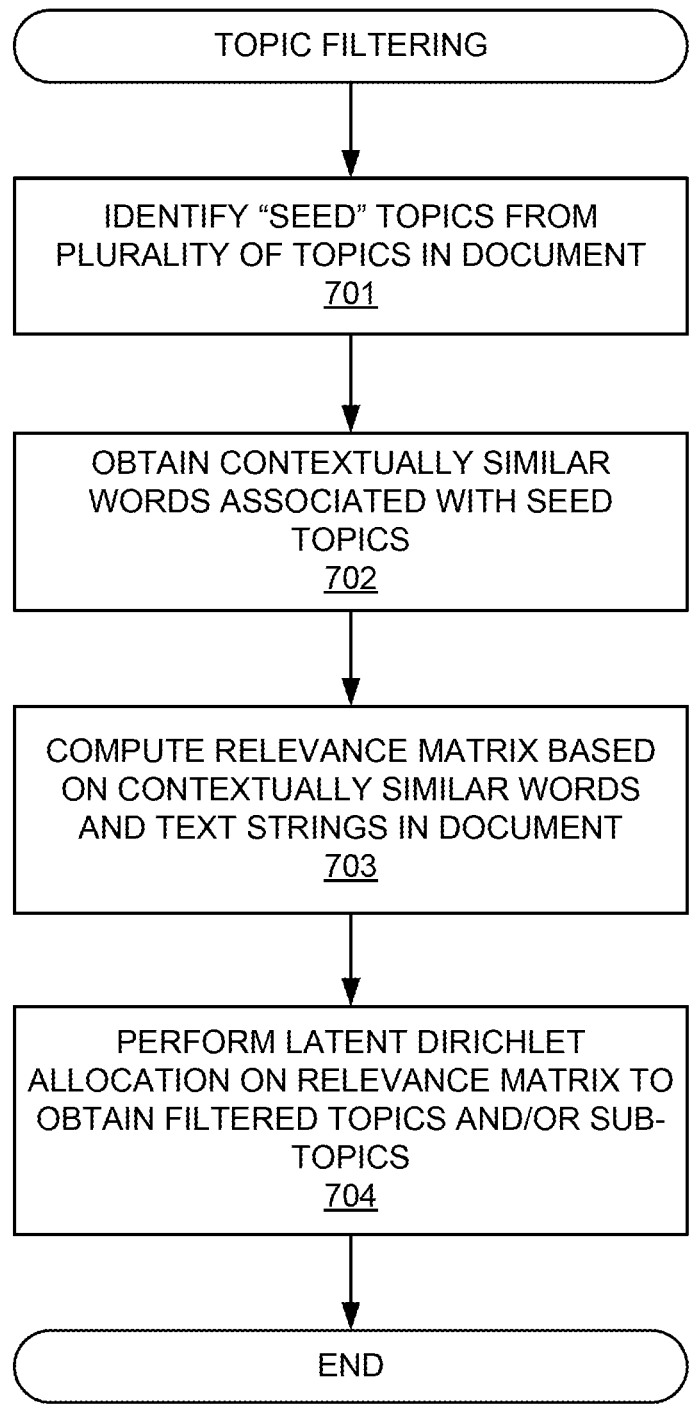
FIG. 7 shows an exemplary method for performing semantic analysis of user-generated content using topic filtering.

FIG. 7 shows an exemplary method for performing semantic analysis of user-generated content using topic filtering. The method of FIG. 7 is illustrated with respect to a content analysis module 120 of FIG. 1 or 420 of FIG. 4. In other embodiments, the method can be implemented with any suitable processing node/module. Although FIG. 7 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 701, a number of "seed" topics are determined from the plurality of topics in the document. The plurality of topics may be retrieved from prior iterations of processing the document, for instance using the methods described in FIGS. 4-6. In an embodiment, a plurality of major recurring issues or topics obtained from user-generated content from various data sources of interest can be identified and categorized, and a number of categories (for instance, 10) may be predefined as "seeds". Alternatively or in addition, the plurality of topics may be known beforehand, and provided as a user input comprising a selection of one or more of the topics as seed topics.

At 702, contextually similar words to the seed topics are obtained by querying models trained with one or more vocabularies. For example, given the following seed categories: "water", "traffic", "sewage and drains", "road and footpath", "public transport", "pollution", "illegal parking", "garbage", "electricity and power", "crime", each of these category names is queried using two Word2Vec models, and the most similar words extracted. A threshold may be set as to contextually similar words, such as the top 40 most similar words. Further, a pretrained global Word2vec model may be used along with a more specific model trained using the specific topic at hand. While the former is trained on a huge corpus and hence is generic, the latter is much more focused on the topic of interest, by virtue of being trained on a smaller amount of data. Further, for conjunction-separated category names, the models are separately queried using both the words in the category name (separated by the conjunction). In other words, querying the neural network model comprises querying a global neural network model and a specific neural network model with each of the one or more seed topics, wherein the specific neural network model is trained using the initial text strings corresponding to at least one of the one or more seed topics.

At 703, the relevance matrix is computed based on the contextually similar words and the text strings in the document. This may be contrasted with the previous method described in FIG. 6, as an alternative to taking into account the cosine similarity of the document with all words in the vocabulary. In this embodiment, only the contextually similar keywords are considered. This second modification significantly reduces the computation complexity, yet captures most of the information. At 704, the LDA operation is performed using the relevance matrix as an input to obtain a distribution of topics. In other words, the input to the LDA is the word-document matrix, where each document is represented as a vector/list of variable length. In a similar embodiment, the number of elements in the vector is the number of words present in the document AND the number of expanded keywords, rather than only the number of expanded keywords. The value of each element is the cosine similarity between the document vector and the word vector.

FIG. 8 shows an exemplary method for integrating new user-generated content and organizing topics. The method of FIG. 8 is illustrated with respect to an integration and organization module 130 of FIG. 1. In other embodiments, the method can be implemented with any suitable processing node/module. Although FIG. 8 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 801, new user-generated content (i.e. text strings published subsequent to the input document used to train the neural network modules) is continuously monitored and retrieved. The new user-generated content is incorporated into the training models, thereby enabling refinement or expansion of the topics determined by previous iterations of the LDA performed on the models. In other words, this enables further classification of new unseen content into any of the topics in the distribution, or to add new topics. This method may be performed periodically. For example, at 802, upon expiration of a timer, an intra-cluster consistency is computed at 803 and compared with a threshold at 804. The intra-cluster consistency is computed on a topic cluster output by said previous iterations, and associated with the location and time as described herein. If the intra-cluster consistency is less than a certain threshold, the cluster in question may be split at 805 to retain the consistency, and a timer is reset before the method begins again at 801. If the intra-cluster consistency meets or exceeds the threshold, the timer is reset and new content continues to be monitored and retrieved at 801.

Numerous advantages may be envisioned by the disclosed systems and methods. For example, identification of semantics of user-generated online content can be used to determine context information as well as to model topics identifying latent issues. Over a period of time, such systems and methods enable generation of a topology of issues correlated with a location and time. Further, a multi-dimensional visualization is enabled by the disclosed systems and methods, enabling service providers and other entities to depict the latent issues on a topographic map that can also be filtered by various combinations of attributes such as semantics, urban contexts, time, and so on. For example, a graph cuboid data structure may be implemented to store, query, and visualize the identified topics. Further, the disclosed systems and methods may be utilized to extract actionable topics or issues from user-generated online content across a plurality of public networks, identify a service provider network associated with the actionable issue, determine a remedial action associated with the actionable issue, and trigger the remedial action via the service provider network. In an exemplary embodiment, a service provider is correlated with the retrieved topics to determine whether or not an identified topic is associated with an actionable issue. A trigger of a remedial action associated with the problem is transmitted to one or more service provider servers, enabling the service provider to perform a remedial action. In some embodiments, a remedial action based on the actionable topic may be transmitted as a recommendation that includes the identified remedial action, the location, and the time. For example, in response to determining that traffic congestion occurs at a particular location at a particular time, a traffic signal system accessible via a traffic management subnetwork hosted on a service provider server may be instructed to modify the frequency of one or more traffic signals, enabling real-time remediation of issues identified from user-generated online content. Other applications of the described techniques will be evident to those having ordinary skill in the art in light of this disclosure.

While the present disclosure has been disclosed in terms of exemplary embodiments in order to facilitate better understanding of the present disclosure, it should be appreciated that the present disclosure can be embodied in various ways without departing from the principle of the disclosure. Therefore, the present disclosure should be understood to include all possible embodiments which can be embodied without departing from the principle of the disclosure set out in the appended claims.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. Other embodiments of the disclosure will be apparent to those skilled in the art from consideration of the specification and practice of the disclosure disclosed herein. It is intended that the specification and embodiment described herein be considered as exemplary only.

The invention claimed is:

1. A method for performing semantic analysis on a user-generated text string, the method comprising:
obtaining a plurality of known text strings from one or more web portals, wherein the plurality of known text strings are obtained by crawling the one or more web portals using one or more application program interfaces (APIs);
cleaning the plurality of known text strings, wherein the cleaning comprises removing generic and domain-specific stop words and uniform resource locator (URL) symbols and text from the plurality of known text strings;
assembling the cleaned plurality of known text strings into an input document;
training a neural network model with the input document to obtain a first distributed vector representation of the cleaned plurality of known text strings and a second distributed vector representation of a plurality of words in the cleaned plurality of known text strings;
computing a relevance matrix of the first and second distributed representations based on a cosine distance between each of the plurality of words and the plurality of known text strings;
performing a latent dirichlet allocation (LDA) operation using the relevance matrix as an input to obtain a distribution of topics associated with the plurality of known text strings;
monitoring the one or more web portals for new text strings using the one or more APIs;
determining that a quantity of the new text strings meets a threshold sufficient to train the neural network model; and
refining the distribution of topics based on adding the threshold quantity of new text strings to the plurality of known text strings to obtain a refined distribution of topics including the new text strings.

2. The method of claim 1, wherein the cleaning further comprises one or more of: identifying and removing spurious textual patterns, correcting spelling, and filtering based on length.

3. The method of claim 1, further comprising narrowing the distribution of topics by:
determining seed topics from the distribution of topics;
obtaining contextually similar words associated with the seed topics;
computing a second relevance matrix based on a cosine distance between each of the contextually similar words and the plurality of known text strings; and
performing the LDA operation using the second relevance matrix as an input to obtain a narrowed distribution of topics.

4. The method of claim 3, wherein the seed topics are determined based on most-recurring topics from the distribution of topics.

5. The method of claim 3, wherein the seed topics are determined based on user input.

6. The method of claim 3, further comprising assigning a high non-zero value to each of the contextually similar words.

7. The method of claim 1, wherein computing the relevance matrix comprises:
projecting the plurality of text strings and the words in the same dimension; and
computing the cosine distance between the plurality of text strings and the words.

8. The method of claim 7, wherein each row of the relevance matrix indicates the cosine distance.

9. The method of claim 7, further comprising filtering the plurality of words prior to generating the relevance matrix.

10. The method of claim 9, wherein the filtering comprises identifying words associated with one or both of a very high or a very low cosine distance.

11. The method of claim 10, further comprising performing the LDA operation using the relevance matrix with the filtered words.

12. The method of claim 1, further comprising determining an actionable issue associated with the topic, identifying a remedial action, and notifying a service provider.

13. A method for performing semantic analysis on a user-generated text string, the method comprising:
obtaining a plurality of known text strings from one or more web portals, wherein the plurality of known text strings are obtained by crawling the one or more web portals using one or more application program interfaces (APIs);
cleaning the plurality of known text strings, wherein the cleaning comprises removing generic and domain-specific stop words and uniform resource locator (URL) symbols and text from the plurality of known text strings;
assembling the cleaned plurality of known text strings into an input document;
training a neural network model with the input document to obtain a first distributed vector representation of the cleaned plurality of known text strings and a second distributed vector representation of a plurality of words in the cleaned plurality of known text strings;
computing a first relevance matrix of the first and second distributed representations based on a cosine distance between each of the plurality of words and the plurality of known text strings;
performing a first latent dirichlet allocation (LDA) operation using the first relevance matrix as an input to obtain a plurality of most-recurring topics from the plurality of text strings;
labeling the plurality of most-recurring topics as seed topics;
extracting a plurality of contextually similar words associated with each of the seed topics, wherein the extracting comprises querying the neural network model;
computing a second relevance matrix based on a cosine distance between each of the plurality of contextually similar words and the plurality of text strings from the user-generated content; and
performing a second latent dirichlet allocation (LDA) operation using the second relevance matrix as an input to obtain a distribution of issues related to the seed topics.

14. The method of claim 13, wherein querying the neural network model comprises querying a global neural network model and a specific neural network model with each of the one or more seed topics, wherein the specific neural network model is trained using known text strings corresponding to at least one of the one or more seed topics.

15. The method of claim 13, further comprising clustering the distribution of issues.

16. The method of claim 13, further comprising:
repeating the operations using new unseen user-generated content from the one or more data sources; and
computing an intra-cluster consistency at an interval.

17. A system for extracting actionable topics from user-generated content, the system comprising:
a first processing module communicably coupled to one or more web portals, the first processing module being configured to obtain a plurality of known text strings from one or more web portals by crawling the one or more web portals using one or more application program interfaces (APIs);
a second processing module communicably coupled to the first processing module, the second processing module configured to:
clean the plurality of known text strings, wherein the cleaning comprises removing generic and domain-specific stop words and uniform resource locator (URL) symbols and text from the plurality of known text strings;
assemble the cleaned plurality of known text strings into an input document;
train a neural network model with the input document to obtain a first distributed vector representation of the cleaned plurality of known text strings and a second distributed vector representation of a plurality of words in the cleaned plurality of known text strings;
compute a relevance matrix of the first and second distributed representations based on a cosine distance between each of the plurality of words and the plurality of known text strings;
perform a latent dirichlet allocation (LDA) operation using the relevance matrix as an input to obtain a distribution of topics associated with the plurality of known text strings;
monitor the one or more web portals for new text strings using the one or more APIs;
determine that a quantity of the new text strings meets a threshold sufficient to train the neural network model;
refine the distribution of topics based on adding the threshold quantity of new text strings to the plurality of known text strings to obtain a refined distribution of topics including the new text strings;
extract a location associated with the refined distribution of topics, a time associated with the refined distribution of topics, and an actionable topic associated with the refined distribution of topics;
identify a remedial action based on the actionable topic; and
transmit a recommendation to a service provider network associated with the actionable topic, wherein the recommendation comprises the identified remedial action, the location, and the time.

18. The system of claim 17, wherein the one or more web portals comprises an online social network, and wherein the known or new text string comprises one or more of a post on the online social network or a reply on the online social network.

19. The system of claim 17, wherein extracting the time or location further comprises:
extracting a time or location metadata from the input document, and
correlating the time or location metadata with a corresponding time or location extracted from the refined distribution of topics.

* * * * *